US008121786B2

(12) United States Patent
Morbey et al.

(10) Patent No.: US 8,121,786 B2
(45) Date of Patent: Feb. 21, 2012

(54) METHOD AND DEVICE FOR PREVENTING COLLISIONS ON THE GROUND FOR AIRCRAFT

(75) Inventors: Joao Morbey, Toulouse (FR); Mathieu Landman, Toulouse (FR); Michel Colin, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 688 days.

(21) Appl. No.: 12/257,970

(22) Filed: Oct. 24, 2008

(65) Prior Publication Data

US 2009/0164122 A1 Jun. 25, 2009

(30) Foreign Application Priority Data

Dec. 20, 2007 (FR) ..................................... 07 60133

(51) Int. Cl.

| | |
|---|---|
| ***G05D 1/02*** | (2006.01) |
| ***G06F 17/10*** | (2006.01) |
| ***G06G 7/78*** | (2006.01) |
| ***G08G 1/16*** | (2006.01) |
| ***F41G 9/00*** | (2006.01) |

(52) U.S. Cl. ......................... 701/300; 701/301; 701/302

(58) Field of Classification Search ........... 701/300–302
See application file for complete search history.

(56) References Cited

U.S. PATENT DOCUMENTS

| | | | | |
|---|---|---|---|---|
| 2003/0093187 | A1* | 5/2003 | Walker | 701/1 |
| 2004/0225440 | A1* | 11/2004 | Khatwa et al. | 701/301 |
| 2005/0222769 | A1* | 10/2005 | Simon | 701/300 |
| 2006/0007021 | A1 | 1/2006 | Konya et al. | |
| 2006/0066470 | A1 | 3/2006 | Anderson et al. | |
| 2007/0106440 | A1 | 5/2007 | Oki et al. | |
| 2007/0177011 | A1* | 8/2007 | Lewin et al. | 348/118 |
| 2008/0125972 | A1* | 5/2008 | Neff | 701/300 |

FOREIGN PATENT DOCUMENTS

| | | | |
|---|---|---|---|
| GB | 2 131 642 | A | 6/1984 |
| WO | WO 2006/027762 | * | 3/2006 |
| WO | WO 2006/027762 | A1 | 3/2006 |

* cited by examiner

*Primary Examiner* — Will Allen
(74) *Attorney, Agent, or Firm* — Oblon, Spivak, McClelland, Maier & Neustadt, L.L.P.

(57) ABSTRACT

The invention has as its object to determine a risk of collision on the ground between an aircraft and another object. The aircraft comprises at least one proximity detector and a communication system suitable for setting up a communication among several points, at least one of the points being able to be external to the aircraft. After having received at least one indication from the proximity detector relating to the presence of an object, a signal representing an acoustic alarm linked to the detection of the object is generated then transmitted to the warning system. A comparison advantageously is made between the indication received from the proximity detector and certain parameters of the aircraft, the signal representing an acoustic alarm linked to the detection of the object being generated in response to the result of this comparison.

14 Claims, 7 Drawing Sheets

METHOD AND DEVICE FOR PREVENTING COLLISIONS ON THE GROUND FOR AIRCRAFT

TECHNICAL DOMAIN OF THE INVENTION

This invention concerns anti-collision devices for aircraft and more particularly a method and a device for an aircraft for preventing risks of collision during maneuvers on the ground.

PRIOR ART

Because of the dimensions of the aircraft and the poor visibility for the personnel in charge of maneuvering them, the risks of collision between aircraft, in flight or on the ground, and between an aircraft and other objects such as airport structures or land vehicles, on the ground, are significant.

Many aircraft are provided with anti-collision devices based on the use of radars suitable for detecting the presence of other aircraft. By way of illustration, a radar can acquire flight information such as the position, the speed and the direction of each of the aircraft observed. This information is used for determining the virtual spaces in which the aircraft are likely to be situated. The intersections between these virtual spaces represent zones for risk of collision.

These systems, however, generally are effective only under certain conditions. In particular, when the aircraft are on the ground, these systems are deactivated because of the many radar wave reflections that disrupt the system.

Furthermore, there are monitoring systems that may or may not be coupled with the radars. Such systems comprise in particular video cameras connected up to a screen in the cockpit, making it possible for the pilot to visualize the immediate environment of the aircraft. These cameras are arranged, for example, at the tips of the wings and on top of the fin. Their function is not to detect risks of collision but to make it possible for the pilot, when a risk has been identified, to quantify this risk. The use of such systems, however, requires good visibility conditions.

On the ground, the aircraft may be maneuvered by the pilots themselves or by operators of towing vehicles to which the aircraft are attached.

In general, the phase during which an aircraft is maneuvered on the ground by the pilots with the aid of the locomotive means of the aircraft is referred to as "taxi." Such maneuvers concern, for example, the movements carried out between the takeoff and landing runways and the parking places. The phase during which an aircraft is maneuvered with the aid of a towing vehicle, also referred to as tow tug in Anglo-Saxon terminology, is referred to as towing. It involves, for example, maneuvers intended for the movement of an aircraft to or from a hangar or maneuvers intended for backing an aircraft away from a terminal for passengers.

Because of an increasingly extensive use of aircraft and demands for profitability, aircraft traffic on the ground is increasingly heavy. Thus, despite safety instructions, there results therefrom a particularly significant risk of collision that leads to very high costs linked to the repair and the grounding of the aircraft.

The invention makes it possible to resolve at least one of the problems previously set forth.

OBJECT OF THE INVENTION

The invention therefore has as an object a method for determining a risk of collision on the ground in an aircraft, the said aircraft comprising at least one proximity detector and one warning device, this method comprising the following steps, receipt of at least one indication from the said proximity detector relating to the presence of an object;

generation of at least one signal representing an alarm linked to the detection of the said object; and transmission of the said alarm to the warning device.

The method according to the invention thus makes it possible to warn, in particular visually and/or acoustically, the crew and/or the ground personnel about a risk of collision between the aircraft and an object such as another aircraft or an infrastructure element. The warning device used advantageously is a standard device commonly used in aircraft. The warning device is, for example, an FWS (acronym for Flight Warning System in Anglo-Saxon terminology).

According to one specific embodiment, the said warning device comprises a communication system suitable for setting up a communication among several points. This communication system advantageously is the one that is commonly installed in aircraft in order to make it possible for the members of the crew to communicate with each other.

Still according to one specific embodiment, at least one of the said points is external to the said aircraft. Again, this communication system advantageously is the one that is commonly installed in aircraft in order to make it possible for the members of the crew to communicate with each other and with the ground personnel.

Advantageously, the method furthermore comprises a step of comparison of the said at least one indication received from the said proximity detector with at least one parameter of the said aircraft, the said signal representing an alarm linked to the detection of the said object being generated in response to the result of the said comparison. The method according to the invention thus makes it possible to minimize the number of false warnings by taking into account, for example, the speed and the direction of movement of the aircraft.

According to one specific embodiment, the said alarm comprises an indication relating to the proximity of the said detected object. Such an indication makes it possible, for example, to determine a spatial or temporal proximity of the risk.

Still according to one specific embodiment, the said alarm comprises a visual alarm comprising a symbolic representation of the said aircraft and a symbolic representation of the said detected object, the position of the said symbolic representation of the said detected object relative to the symbolic representation of the said aircraft being representative of the position of the said detected object relative to the said aircraft. Such a representation allows the crew and/or the ground personnel to evaluate the risk of collision and provides a visual aid making it possible to determine the necessary actions to avoid the collision.

The invention also has as an object device for determining a risk of collision on the ground in an aircraft comprising a warning system, this device comprising the following means, means for detecting the proximity of at least one object and transmitting an indication relating to the said detection of the said object;

means for generating at least one signal representing an alarm in response to the said indication relating to the said detection of the said object; and means for transmitting the said signal to the said warning system.

The device according to the invention thus makes it possible to warn the crew and/or the ground personnel about a risk of collision between the aircraft and an object such as another aircraft or an infrastructure element. The warning system used preferably is a standard system commonly used in aircraft. The warning system is, for example, an FWS.

According to one specific embodiment, the said warning system comprises a communication system suitable for setting up a communication among several points, at least one of the said points being external to the said aircraft. This communication system advantageously is the one that is commonly installed in aircraft in order to make it possible for the members of the crew to communicate with each other and with the ground personnel.

Advantageously, the device furthermore comprises means for comparing the said indication received relating to the said detection of the said object with at least one parameter of the said aircraft, the said means for generating at least one signal representing an alarm being activated in response to the result of the said comparison. The device thus makes it possible to minimize the number of false warnings by taking into account certain parameters of the aircraft such as its speed and its direction.

Still according to one specific embodiment, the said means for detecting the proximity of at least one object are suitable for determining a piece of information on distance and/or position of the said at least one object relative to the said aircraft, the said alarm comprising an indication of the said information. Such a piece of information makes it possible for the crew and/or the ground personnel to evaluate the risk of collision and provides a visual aid for determining the actions necessary in order to avoid the collision.

BRIEF DESCRIPTION OF THE DRAWINGS

Other advantages, purposes and characteristics of this invention emerge from the detailed description that follows, presented by way of non-limitative example, with reference to the attached drawings, in which:

FIG. 4, comprising

DETAILED DESCRIPTION OF THE INVENTION

The invention proposes new means combining the use of proximity detectors, or proximity sensors, with warning and/or communication systems of aircraft in order to warn the crew thereof as well as, preferably, the ground personnel, about the risks of collisions during a maneuver of the aircraft on the ground.

As illustrated on FIG. 1, proximity detectors are arranged at several places of an aircraft, preferably in the zones the most exposed to collisions, for example at the tip of the wings, on the nose and on the tail.

Figure 1A:
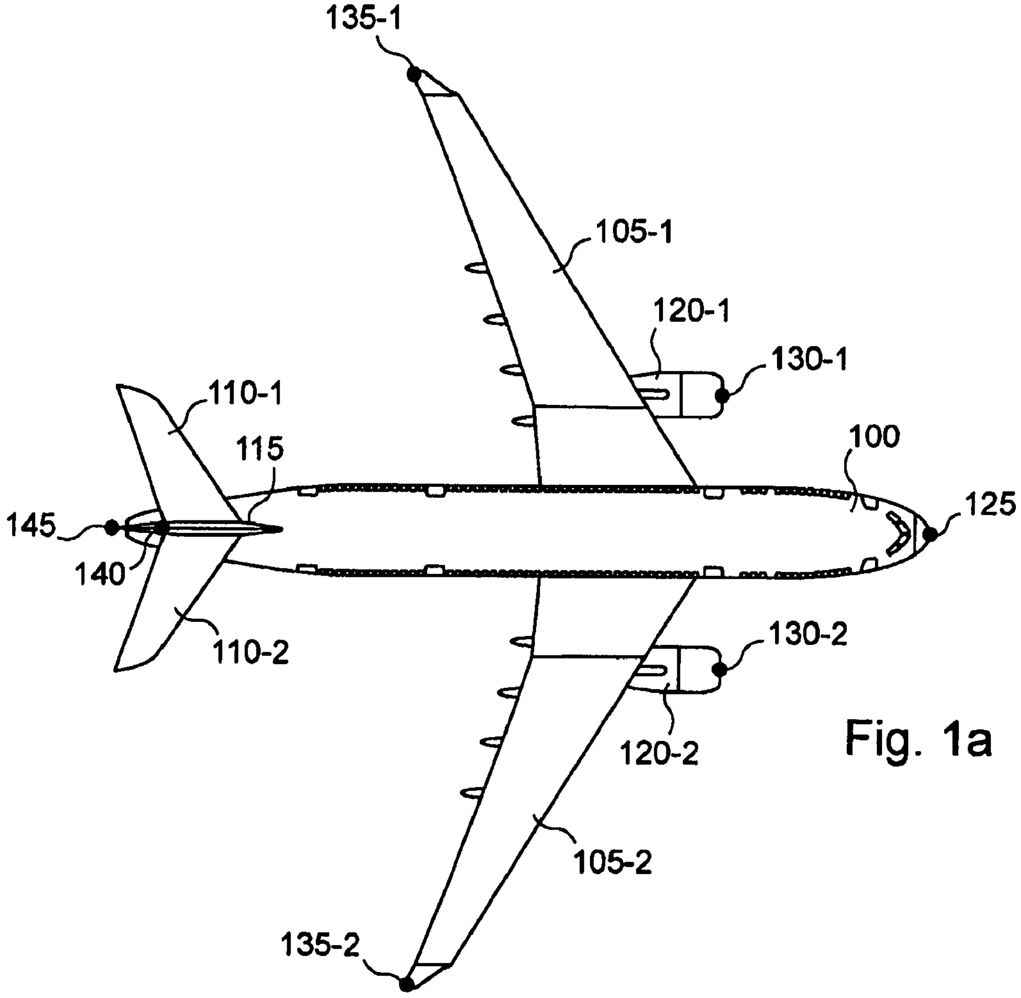
FIG. 1, comprising FIGS. 1*a* and 1*b*, schematically illustrates an aircraft on which proximity detectors have been installed.
Figure 1B:
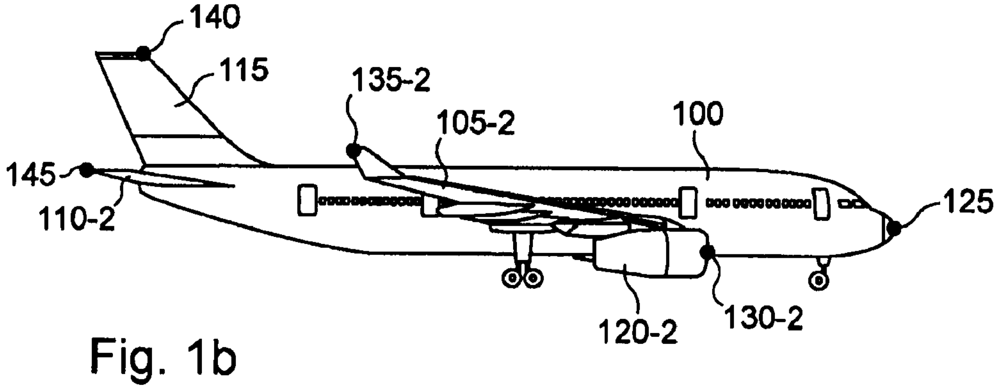

FIG. 1, comprising FIGS. 1*a* and 1*b*, schematically illustrates an aircraft 100 on which proximity detectors have been installed.

FIG. 1*a* is a view from above of the aircraft 100 while FIG. 1*b* is a side view (right side). The aircraft 100 here comprises two main wings 105-1 and 105-2, two horizontal tailplanes 110-1 and 110-2 and a fin 115. Each of the wings 105-1 and 105-2 supports an engine, here a jet engine, 120-1 and 120-2, respectively.

A proximity detector 125 is located on the nose of the aircraft. Two other proximity detectors 130-1 and 130-2 are located in front of the jet engines 120-1 and 120-2. Likewise, two proximity detectors 135-1 and 135-2 are located at the end of the wings 105-1 and 105-2. Finally, a proximity detector 140 is located on top of the fin and a proximity detector 145 is located on the tail of the aircraft.

Naturally, these locations for proximity detectors are given only by way of illustration. It is possible to use fewer proximity detectors or, on the contrary, to use more of them. It also is possible to position these proximity detectors at other locations. In general, the position of the proximity detectors is determined according to the main zones of impact in the event of collision and the range of detection of these proximity detectors.

Preferably, the proximity detectors are used only when the aircraft is on the ground. Nonetheless, as they are placed on the outside of the aircraft, they must be compatible with aeronautical constraints. For example, the position detectors must withstand considerable fluctuations in temperature and pressure (altitude). Alternatively, the proximity detectors can be protected with suitable materials.

The proximity detectors preferably are connected up to a centralized module for detection of risk of collision on the ground. When a proximity detector detects an object, it transmits a signal to this module. In a simple version, the proximity detectors transmit a simple signal when an object is detected. In a more sophisticated version, the proximity detectors moreover can indicate a distance between the detector and the object as well as the direction in which the object has been detected.

The centralized module for detection of risk of collision determines the risks of collision from the signals originating from the proximity detectors and from certain parameters of the aircraft such as its speed relative to the ground and its direction of movement, and in turn transmits a signal representing an acoustic and/or visual alarm. Thus, when an object is detected in the vicinity of the aircraft, an acoustic and/or visual signal is audible and/or visible to the crew of the aircraft and/or to the ground personnel.

The proximity detectors are, for example, infrared sensors consisting of an infrared light transmitter and receiver. Short light pulses are transmitted by the transmitter. An object is detected when at least some light pulses are reflected by an object. It is possible to measure the time required for a light pulse to be reflected and to infer therefrom the distance of the reflecting surface. Infrared rangefinders, based on the use of a set of infrared sensors and on the principle of triangulation, also may be used to detect an object and to determine its distance. The use of a lens moreover may make it possible to determine the position of the reflecting surface.

Figure 2:
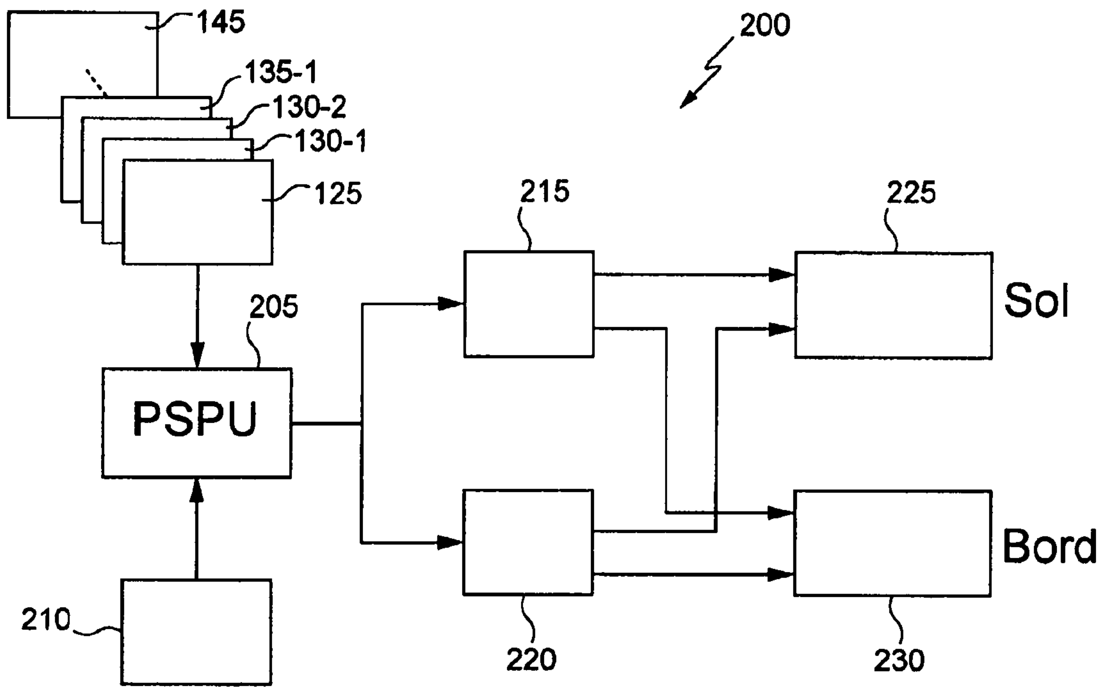
FIG. 2 schematically illustrates a first example of architecture of the system for prevention of collisions on the ground according to the invention.

FIG. 2 schematically illustrates a first example of architecture 200 of the system for prevention of collisions on the ground according to the invention.

The proximity detectors used, for example the proximity detectors 125, 130-1, 130-2, 135-1, 135-2, 140 and 145 illustrated on FIG. 1, are connected to a centralized module 205 for detection of risk of collision, also referred to here as PSPU (acronym for Proximity Sensors Processor Unit in Anglo-Saxon terminology). The detection module 205 is suitable for receiving all the detection signals originating from the proximity detectors through a cable, standard or specific, or via wireless communication means.

Furthermore, the detection module 205 is connected up to an avionic system 210 suitable for transmitting parameters of the aircraft such as the speed of the latter and its direction of movement. The connection between the detection module 205 and the avionic system 210 preferably is standard. For example, the detection module 205 can be connected up to a data communication network such as an AFDX (acronym for Avionics Full DupleX in Anglo-Saxon terminology) network, to which the avionic system 210 would be connected.

With the aid of the information received, the detection module 205 determines, preferably in real time, a risk of collision. Advantageously, the information about distances and/or positions of the detected objects also is used to determine a risk of collision.

By way of illustration, if the proximity detector located on the nose of the aircraft detects an object but the speed vector (speed and direction) of the aircraft indicates that the latter is backing up, no collision warning signal is transmitted. Conversely, if the proximity detector located on the tail of the aircraft detects an object and the speed vector of the aircraft indicates that the latter is backing up, a collision warning signal is transmitted.

A risk of collision may be determined, for example, by comparing the information originating from the proximity detectors with certain parameters of the aircraft according to predetermined rules or with the aid of a mathematical model able to take the geometry of the aircraft into account.

The speed and direction of movement of the aircraft also may be used to determine the temporal and/or spatial proximity of the risk according to the distance between a detected object and a proximity detector, the position of the proximity detectors on the aircraft being predetermined.

The detection module 205 also is suitable for creating one or more signals representing a warning of risk of collision, for example in acoustic or visual form. These signals may be simple signals indicating a risk of collision or complex signals indicating a risk of collision and detailing this risk. Such detailed explanations are, for example, an indication relating to the distance of the detected object, to its position or to the temporal proximity of the possible collision.

The detection module 205 advantageously is suitable for creating and transmitting an acoustic alarm and a visual alarm when a risk of collision is detected.

The signals created here are transmitted to a voice communication module 215 and to a data communication module 220.

It should be noted that the system according to the invention preferably uses the resources available in the aircraft. Thus, the modules 215 and 220 here are those used by the aircraft to transfer information. Only the proximity detectors and the detection module 205 that has the purpose of concentrating the information linked to the risks of collision on the ground and of generating the alarms here are specific to the system according to the invention.

Voice communication module 215 is connected to a device 225 making possible the reproduction of acoustic messages, for example a headset or a loudspeaker, for the ground personnel, as well as a device 230, equivalent to the device 225 but intended to transmit acoustic messages to the crew.

Likewise, data communication module 220 is connected to devices 225 and 230 here comprising means for displaying a visual alarm, for example in the form of illuminated indications, images or video.

The acoustic alarms generated by detection module 205 advantageously are transmitted with the aid of a standard communication system, via a bidirectional communication link. This communication system, sometimes referred to as Service Interphone System or SIS in Anglo-Saxon terminology, makes it possible to set up communications among the members of the crew, from different places, as well as communications between the crew and the ground personnel through connectors, accessible from outside the aircraft. These connectors are located at several points, for example under the cockpit, near the engines and in the holds. In this way, by connecting an audio device such as a headset equipped with a microphone, the ground personnel can communicate with the crew and, because of the link between the detection module 205 and the communication system, hear the alarms for risk of collision.

Figure 3:
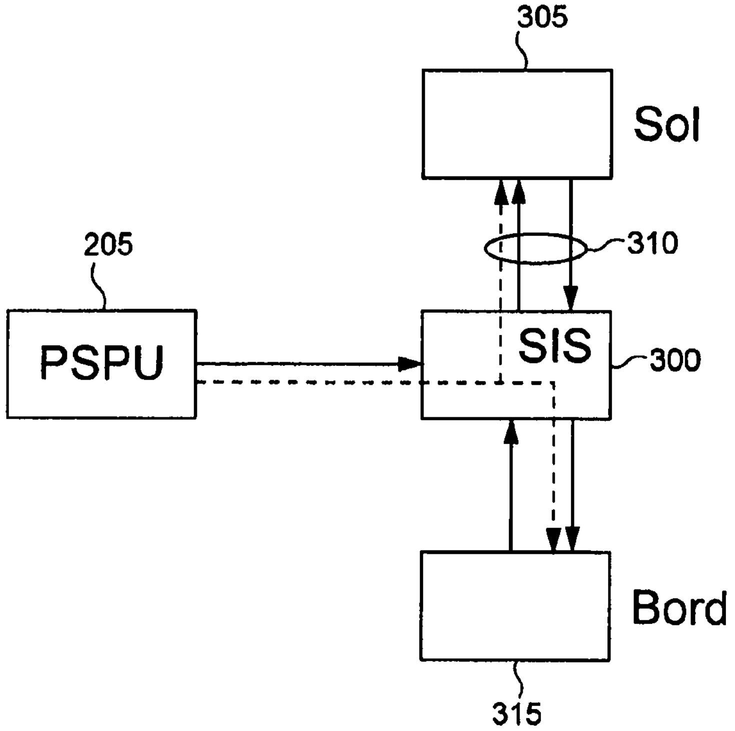
FIG. 3 illustrates more precisely the connection between a centralized module for detection of risk of collision on the ground and a communication system.

FIG. 3 illustrates more precisely the connection between detection module 205 and such a communication system.

As indicated previously, detection module 205 is connected up to communication system 300 which itself is connected up to audio transmission devices or to connectors making it possible to connect such devices. Communication system 300 thus is connected up to audio transmission devices 305, if need be with the aid of connectors 310, making it possible for the ground personnel to set up a communication with the crew and to hear the alarms. Likewise, communication system 300 is connected up to audio transmission devices 315 making it possible for the crew to set up a communication with the ground personnel and to hear the alarms.

The acoustic alarms generated by detection module 205 may be of several types. It may involve a simple alarm the sound of which indicates that a risk of collision has been detected. It also may involve an alarm the sound of which indicates that a risk of collision has been detected and the acoustic level or frequency of which are determined according to the proximity of the risk. Finally, the acoustic alarm may be a three-dimensional sound generated from a stereo source according to which the perceived source of the sound corresponds to the point of impact of the possible collision. A stereo sound of this nature is produced with the aid of a standard module for generation of three-dimensional audio signals according to the relative positions of the acoustic source and the listening point. These three types of alarms may be combined.

In the same way, the visual alarm generated by detection module 205 may be of several types. It may involve a simple alarm indicating that a risk of collision has been detected, for example the activation of a warning light.

It also may involve a representation of the aircraft, in image or video form, on which the proximity detector or detectors having detected an object are indicated. Such a representation also may comprise an indication of the relative position of the detected object in relation to the aircraft. According to the available information, this indication may be a simple distance, materialized by an outline around the proximity detector or detectors or a symbolic representation of the detected object. Such a visual alarm may be displayed on a monitor screen in the cockpit or in a display system known as head up.

It also may be displayed on a monitor screen arranged outside the aircraft or transmitted to a monitor screen of a towing vehicle with the aid of a communication link, wired or wireless, similar to the audio communication link.

Figure 4A:
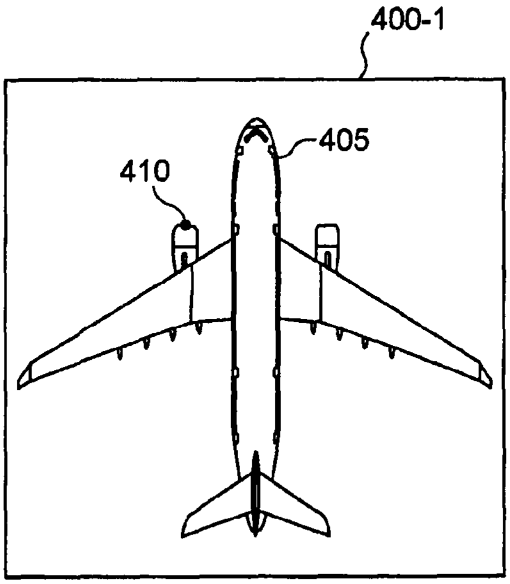
FIGS. 4*a*, 4*b* and 4*c*, illustrates examples of visual alarms that can be displayed in order to indicate a risk of collision.
Figure 4B:
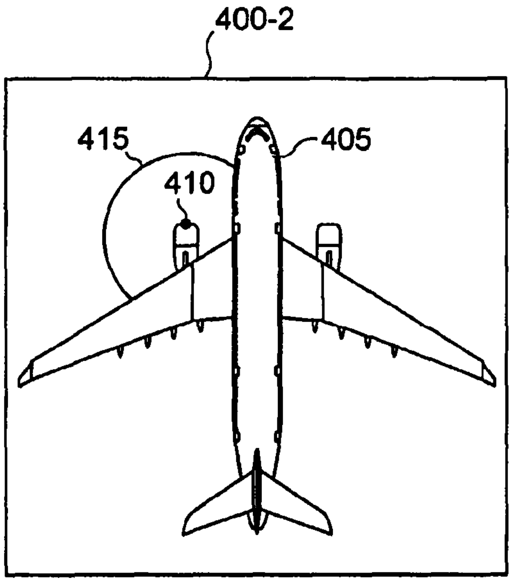
Figure 4C:
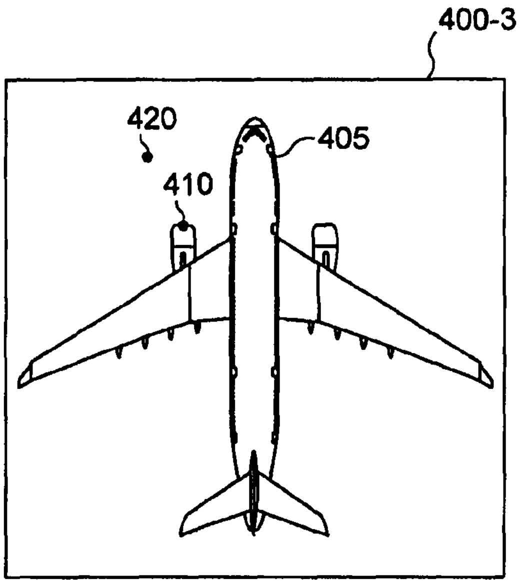

FIG. 4, comprising FIGS. 4*a*, 4*b* and 4*c*, illustrates examples of visual alarms that may be displayed in order to indicate a risk of collision.

FIG. 4*a* illustrates a visual alarm 400-1 here comprising a schematic representation of an aircraft 400 on which the position of the proximity detector 410 having detected an object is indicated.

FIG. 4*b* illustrates a visual alarm 400-2 comprising a schematic representation of an aircraft 400 on which the position of the proximity detector 410 having detected an object is indicated as well as the distance of the detected object. This distance here is materialized by an arc 415 centered on the proximity detector 410.

FIG. 4*c* illustrates a visual alarm 400-3, comprising a schematic representation of an aircraft 400, on which the position of the proximity detector 410 having detected an object as well as the position 420 of the object are indicated.

The type of visual alarm displayed may be linked to the nature of the detection module used or to a display choice determined by the crew and/or the ground personnel.

Figure 5:
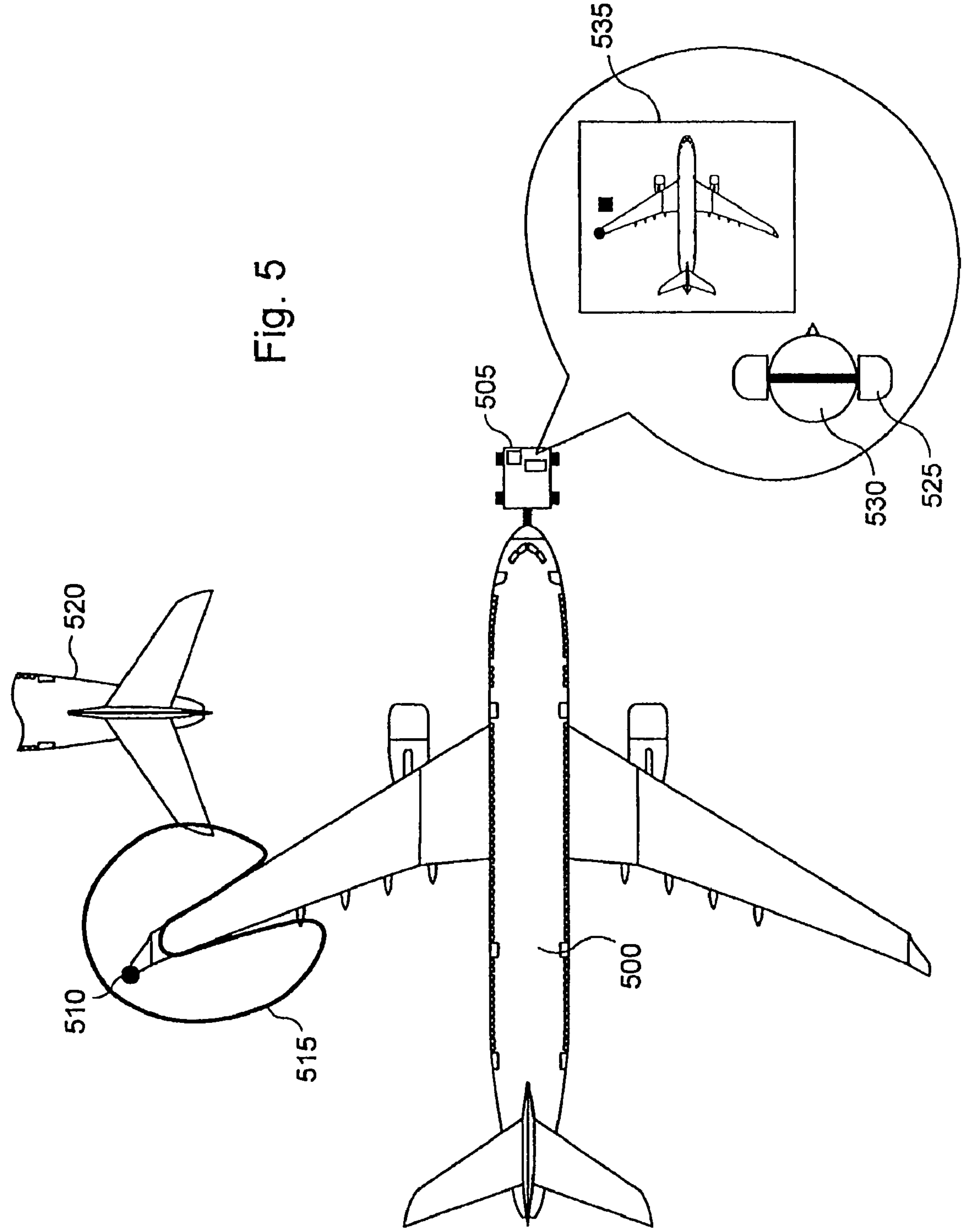
FIG. 5 illustrates an example of use of the system according to the invention when an aircraft is towed by a towing vehicle.

FIG. 5 illustrates an example of use of the system according to the invention when an aircraft 500 is towed by a towing vehicle 505. When the aircraft is connected up to the towing vehicle, an audio connection is set up with the aid of a connector installed on the aircraft, on the outside, and connected up to the SIS system of the aircraft. Likewise, a video connection is established according to the same principle.

When a proximity detector, here the proximity detector 510, detects an object, here the aircraft 520, a signal is transmitted to a detection module that generates acoustic and visual warnings. An acoustic alarm then is generated in the SIS system while a visual alarm is transmitted on a communication network.

The detection perimeter of the object associated with the movement detector 510 is represented by the curve 515.

The acoustic alarm here is reproduced in the audio headset 525 of the operator 530 of the towing vehicle 505. Simultaneously, a visual alarm 535 is displayed on a monitor screen of the towing vehicle. The visual alarm here indicates the position of the proximity detector at the source of the warning as well as the position of the detected object.

The operator of the towing vehicle then can stop or adjust his maneuver in order to avoid a collision between the aircraft 500 and 520.

Figure 6:
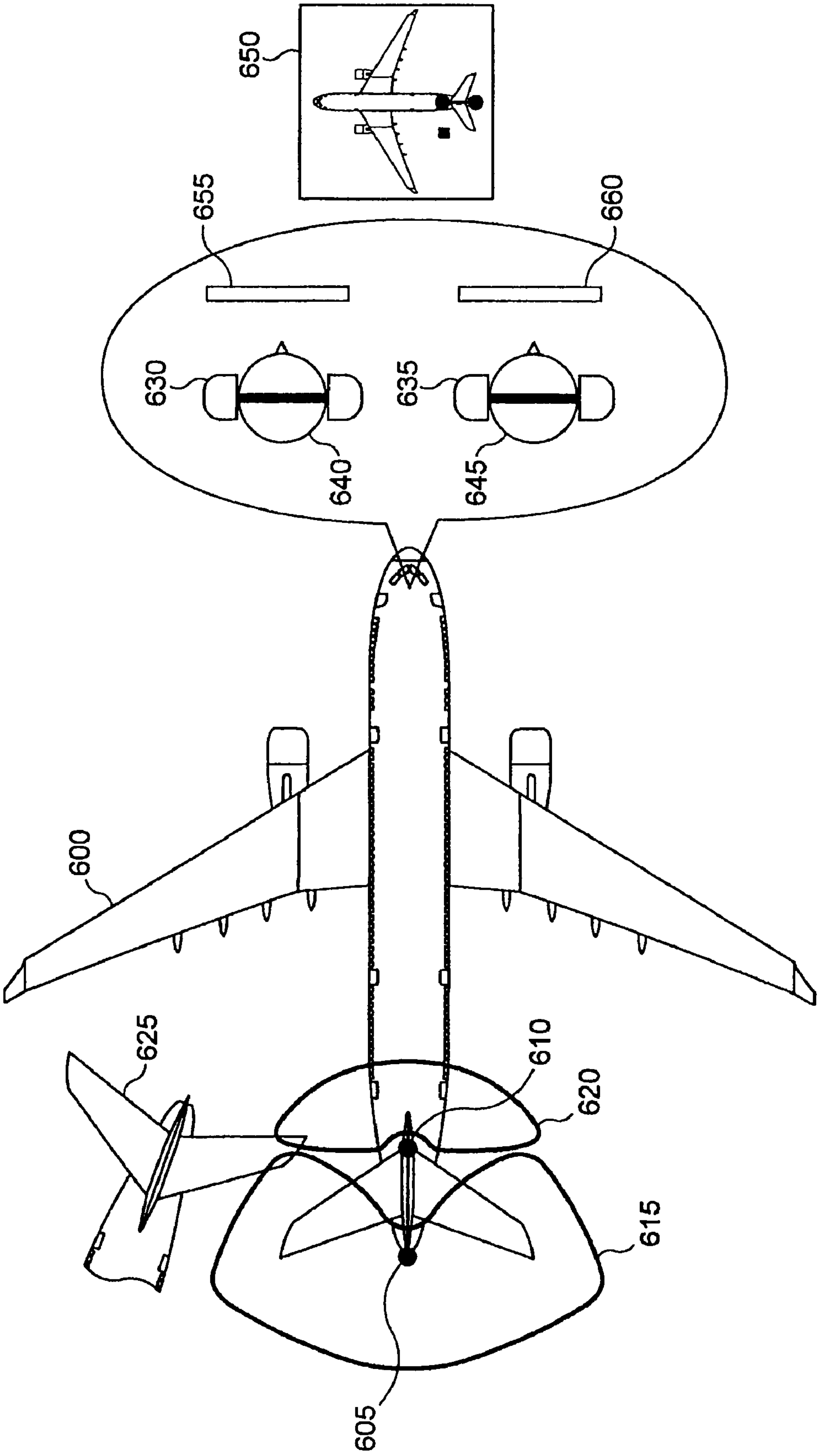
FIG. 6 illustrates an example of use of the system according to the invention when an aircraft is in movement during a taxi phase.

FIG. 6 illustrates an example of use of the system according to the invention when an aircraft 600 is in movement during a taxi phase.

Here only proximity detectors 605 and 610, as well as the corresponding field for detection of objects 615 and 620, respectively, are represented. As shown, an object 625 is located at least partially in the field for detection of objects of proximity detectors 605 and 610.

A signal therefore is transmitted by each of these detectors to a detection module that generates acoustic and visual warnings. An acoustic alarm then is generated in the SIS system while a visual alarm is transmitted on a communication network.

The acoustic alarm then is reproduced in the audio headsets 630 and 635 of the pilot 640 and the copilot 645 of the aircraft 600. Simultaneously, a visual alarm 650 is displayed on the monitor screens 655 and 660 of the aircraft 600. As shown, the visual alarm indicates the position of the proximity detectors at the source of the warning as well as the position of the detected object.

Figure 7:
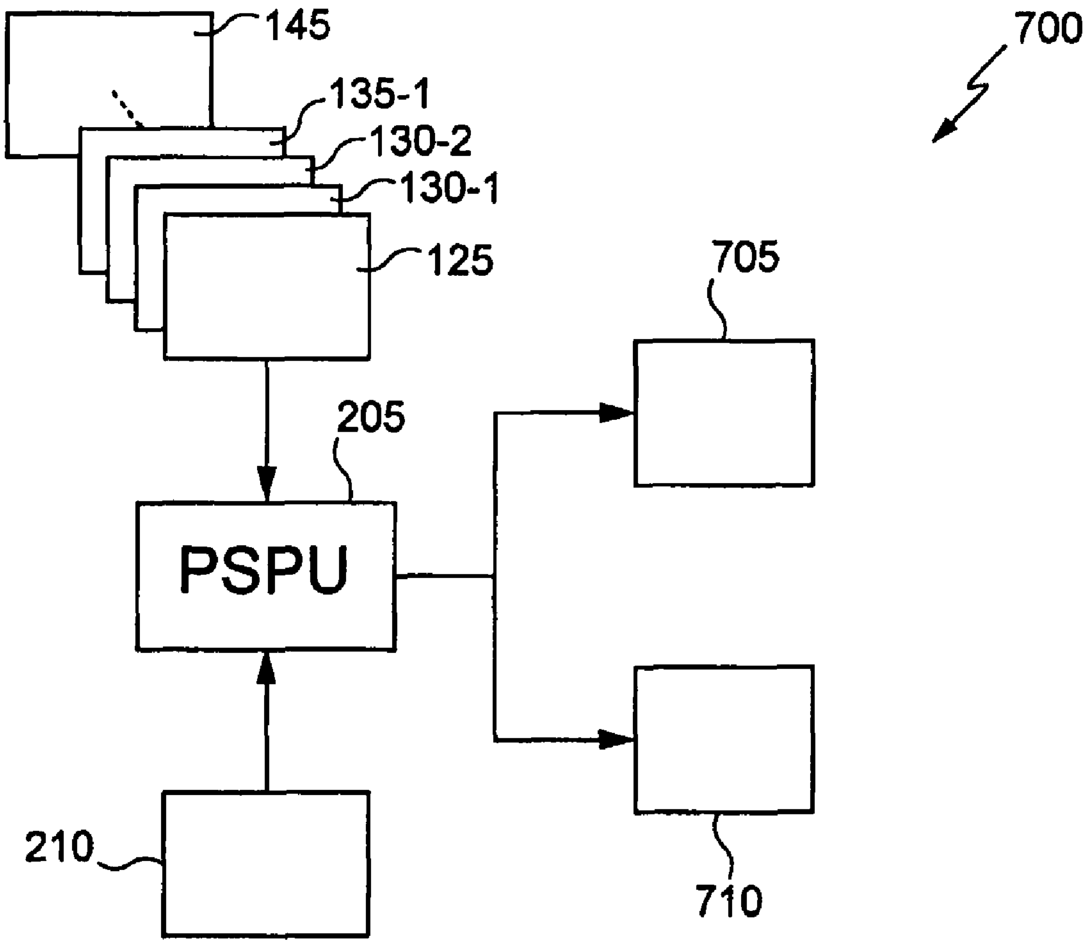
FIG. 7 schematically illustrates a second example of architecture of the system for prevention of collisions on the ground according to the invention.

FIG. 7 schematically illustrates a second example of architecture 700 of the system for prevention of collisions on the ground according to the invention.

The proximity detectors used, for example proximity detectors 125, 130-1, 130-2, 135-1, 135-2, 140 and 145 illustrated on FIG. 1 are connected to a centralized module 205 for detection of risk of collision (PSPU). As indicated previously, the detection module 205 is suitable for receiving all the detection signals originating from the proximity detectors through a cable, standard or specific, or via wireless communication means.

Furthermore, detection module 205 is connected up to an avionic system 210 suitable for transmitting parameters of the aircraft such as the speed of the latter and its direction of movement. The connection between the detection module 205 and the avionic system 210 preferably is standard. For example, detection module 205 can be connected up to a data communication network such as an AFDX network, to which the avionic system 210 would be connected.

With the aid of the information received, the detection module 205 determines, preferably in real time, a risk of collision. Information about distance and/or positions of detected objects advantageously is used to determine a risk of collision.

By way of illustration, if the proximity detector located on the nose of the aircraft detects an object, but the speed vector (speed and direction) of the aircraft indicates that the latter is backing up, no collision warning signal is transmitted. Conversely, if the proximity detector located on the tail of the aircraft detects an object and the speed vector of the aircraft indicates that the latter is backing up, a collision warning signal is transmitted.

A risk of collision may be determined, for example, by comparing the information originating from the proximity detectors with certain parameters of the aircraft according to predetermined rules or with the aid of a mathematical model able to take the geometry of the aircraft into account.

The speed and direction of movement of the aircraft also may be used to determine the temporal and/or spatial proximity of the risk depending on the distance between a detected object and a proximity detector, the position of the proximity detectors in the aircraft being predetermined.

Detection module 205 also is suitable for creating one or more signals representing a warning of risk of collision, for example in acoustic or visual form. These signals may be simple signals indicating a risk of collision or complex signals indicating a risk of collision and detailing this risk. Such detailed explanations are, for example, an indication relating to the distance of the detected object, to its position or to the temporal proximity of the possible collision.

Detection module 205 advantageously is suitable for creating and transmitting an acoustic alarm and a visual alarm when a risk of collision is detected.

The signals created here are transmitted to a standard warning system 705, also referred to as FWS (acronym for Flight Warning System in Anglo-Saxon terminology), and to a display module 710.

Warning system 705 comprises devices for management of the warning messages, in particular to manage the priorities among the warning messages received and to alert the crew, for example in the form of acoustic messages transmitted through audio headsets or loudspeakers.

Module 710 comprises means for displaying a visual alarm, for example in the form of illuminated indications, images or video, as previously described.

Figure 8:
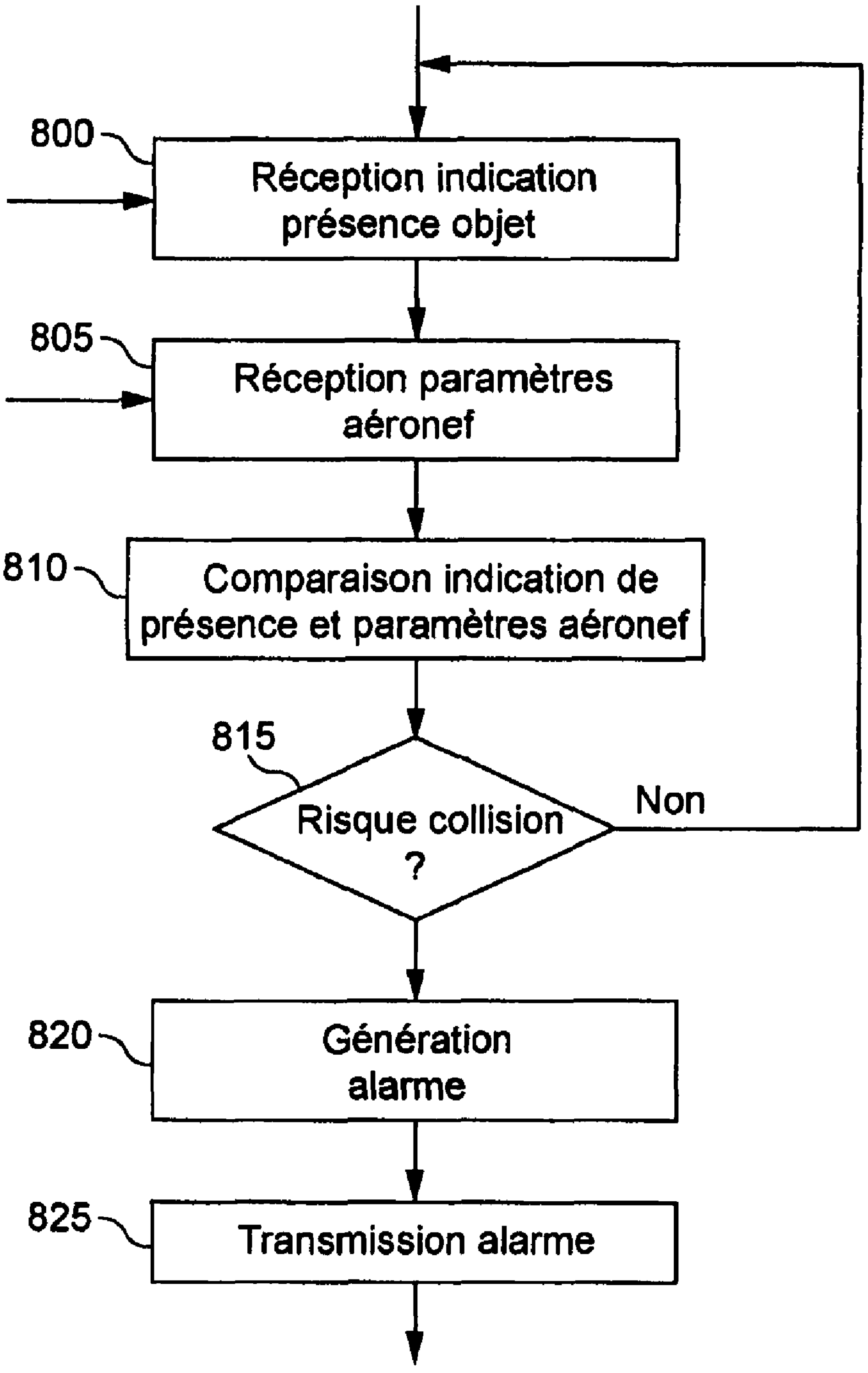
FIG. 8 illustrates the method implemented in the systems illustrated on FIGS. 2, 3 and 7.

FIG. 8 illustrates the method implemented in the modules previously described, in particular with reference to FIGS. 2, 3 and 7. After having received a signal from one or more proximity detectors (step 800) and, preferably, certain parameters of the aircraft (step 805), a comparison is made (step 810) in order to determine whether there is a risk of collision.

The comparison may consist, for example, in comparing the position of the proximity detector having detected an object with the direction of movement of the aircraft. If the signal received from the proximity detector or detectors comprises an indication relating to the position of the detected object, the comparison may consist in comparing the position of the detected object to the volume created by the movement of the aircraft in order to determine whether there is a risk of collision.

If there is no risk of collision, the preceding steps are repeated (steps 800 to 810).

If a risk of collision has been determined, an acoustic and/or visual alarm is generated (step 820) and transmitted (step 825) to the crew and/or the ground personnel.

If no parameter of the aircraft is taken into account, an alarm is generated as soon as at least one proximity detector detects an object.

The method described may be implemented with the aid of a calculator in the form of a computer program.

It should be noted that the range of detection of the proximity detectors may be determined by the speed of movement of the aircraft in order to guarantee a constant reaction time for the crew and/or the ground personnel before the risk of collision.

The method and the device for prevention of collisions on the ground for aircraft may be coupled with a system of automatic piloting in order to reduce the risks of collision when the risk is linked to the movement of the aircraft and the latter is moving with the aid of its own locomotive means.

Naturally, in order to meet specific requirements, an individual skilled in the domain of the invention will be able to apply modifications in the preceding description.

The invention claimed is:

1. A method for determining a risk of collision on the ground in an aircraft, the aircraft including at least one proximity detector, at least one warning device and a communication system that includes a plurality of access points and is configured to communicate between pairs of the plurality of access points, the method comprising:

receiving at least one indication from the proximity detector of a detection of an object;

comparing the at least one indication received from the proximity detector with at least one parameter of the aircraft;

generating, in response to a result of the comparison, at least one signal representing an alarm linked to the detection of the object; and transmitting the alarm to the at least one warning device via the communication system, the at least one warning device being connected to one of the plurality of access points.

2. The method according to claim 1, wherein the communication system is configured to bidirectionally communicate between the pairs of the plurality of access points.

3. The method according to claim 1 or claim 2, further comprising transmitting at least one audio-type signal between two of the plurality of access points.

4. The method according to claim 1, wherein the alarm includes a visual alarm that includes a symbolic representation of the aircraft and a symbolic representation of the detected object, and a position of the symbolic representation of the detected object in relation to the symbolic representation of the aircraft is representative of a position of the detected object in relation to the aircraft.

5. The method according to claim 1, wherein the at least one parameter of the aircraft includes a speed of the aircraft.

6. The method according to claim 1, wherein the at least one parameter of the aircraft includes a direction in which the aircraft is travelling.

7. The method according to claim 6, wherein the proximity detector detects the object positioned in the direction in which the aircraft is travelling, and the signal representing the alarm linked to the detection of the object is generated.

8. The method according to claim 6, wherein the proximity detector detects the object positioned in a direction that is not the direction in which the aircraft is travelling, and the signal representing the alarm linked to the detection of the object is not generated.

9. The method according to claim 1, wherein the at least one warning device includes an acoustic alarm configured to generate three-dimensional sound.

10. The method according to claim 9, wherein a perceived source of the three-dimensional sound corresponds to a point of impact of a possible collision.

11. A device for determining a risk of collision on the ground in an aircraft that includes at least one warning system and a communication system that includes a plurality of access points and is configured to communicate between pairs of the plurality of access points, the device comprising:

a proximity detector configured to detect a proximity of at least one object and transmit an indication of a detection of the object;

the warning system configured to compare the at least one indication received from the proximity detector with at least one parameter of the aircraft, and generate, in response to a result of the comparison, at least one signal representing an alarm linked to the detection of the object; and a transmitter configured to transmit the signal via the communication system, the at least one warning system being connected to an access point of the plurality of access points.

12. The device according to claim 11, wherein the communication system is configured to bidirectionally communicate between the pairs of the plurality of access points.

13. The device according to claim 11 or claim 12, wherein at least one of the plurality of access points is external to the aircraft.

14. The device according to claim 11, wherein the proximity detector is configured to detect a piece of information about a distance and/or position of the at least one object relative to the aircraft, and the alarm includes an indication of the piece of information.

* * * * *